United States Patent [19]

Sasaki

[11] Patent Number: 4,743,927

[45] Date of Patent: May 10, 1988

[54] PRINTING APPARATUS

[75] Inventor: Ichiro Sasaki, Nagoya, Japan

[73] Assignee: Brother Kogyo Kabushiki Kaisha, Nagoya, Japan

[21] Appl. No.: 941,380

[22] Filed: Dec. 15, 1986

[30] Foreign Application Priority Data

Dec. 16, 1985 [JP] Japan .............................. 60-282605

[51] Int. Cl.[4] .............................................. G01D 15/14

[52] U.S. Cl. .......................................... 346/160; 355/1

[58] Field of Search .................. 346/153.1, 160; 355/1

[56] References Cited

U.S. PATENT DOCUMENTS 4,478,504 10/1984 Tanaka .................................... 355/1

4,525,729 6/1985 Agulnek et al. ................ 346/160 X 4,575,739 3/1986 De Schamphelaere et al. ... 346/160

4,640,601 2/1987 Deguchi et al. .................... 355/1 X 4,651,176 3/1987 Yamakawa et al. ................ 346/160

*Primary Examiner*—Patrick R. Salce
*Assistant Examiner*—Marc S. Hoff
*Attorney, Agent, or Firm*—Kane, Dalsimer, Sullivan, Kurucz, Levy, Eisele and Richard

[57] ABSTRACT

A printing apparatus is disclosed wherein a light emitting exposure device is disposed opposite a photosensitive member so as to make a record thereon. The exposure device is provided with a plurality of light sources arranged to be aligned at intervals larger than a preselected exposure density. The exposure device reciprocates so that light emitted from the light sources radiate on a predetermined linear position on the photosensitive member. The light sources are controlled to emit light when they are in proper exposure position.

8 Claims, 3 Drawing Sheets

PRINTING APPARATUS

BACKGROUND OF THE INVENTION

1. Field of the Invention

The present invention relates to a photographic printer, and particularly relates to a photographic printer in which an exposure device for controlling exposure for a photosensitive member is improved.

2. Description of the Prior Art

Conventionally, photographic printers in which a laser, a liquid crystal shutter, or an LED array is used as an exposure device have been superior to other printers in printing speed and in height of resolution of the photographic printer, and reduction in size as well as in cost of the photographic printers have been eagerly expected. The photographic printer having an exposure device which employs such an LED array, a liquid crystal shutter, or the like, is considered to have a bright future because of its features that the printer has no movable portion in the structure of the exposure device and therefore the photographic printer is stable in operation compared with the laser printer and that there is no problem in the rising time required for a rotary system until the printer is enabled to start, etc.

In the photographic printer, however, it is necessary to make all the elements in the LED array or liquid crystal shutter even in light quantity and to improve the degree of integration of the elements, in order to improve the resolution of the photographic printer. In the photographic printer in which an LED array is used, it is required to connect a plurality of LED tips in which numbers of LED elements are integrated, and therefore it is necessary to perform light quantity correction for every LED element or for every LED tip, resulting in increase in cost of LED array modules.

SUMMARY OF THE INVENTION

It is therefore an object of the present invention to eliminate the drawbacks in the conventional photographic printers.

It is another object of the present invention to provide a photographic printing apparatus, in which an LED array or a liquid crystal shutter is improved so as to make the resolution of the photographic printer high and so as to increase the yield of the photographic printer to thereby achieve the reduction in cost of the photographic printer.

To achieve the above objects, according to an aspect of the present invention, the photographic printing apparatus comprises: a photosensitive member; an exposure device disposed in opposition to the photosensitive member and controlled to emit light so as to expose said photosensitive member to make record thereon, the exposure device being provided with a plurality of light sources arranged to be aligned at intervals larger than a pitch of exposure density previously set so as to expose the photosensitive member; means for controlling the light sources to emit light when the light sources are disposed at predetermined exposure positions as the exposure device moves; and means for moving the exposure device to reciprocate in such a direction that the light emitted from the light sources are radiated on a predetermined linear position on the photosensitive member.

The photographic printing apparatus according to the present invention employs an exposure device on which light sources are disposed at intervals larger than the pitch of exposure density to thereby decrease the absolute number of the light sources, and in order to compensate for the decrease in number of the light sources, light emission of the light sources is controlled while moving the light sources substantially in the direction of alignment of the light sources. Accordingly, the direction of movement of the light sources is defined as the direction along which the light sources is moved such that each of the light sources moves over a distance opposite to an exposure pitch to be exposed by the light source on the photosensitive member. For example, when the moving speed of the light sources is extremely higher than the moving speed of the photosensitive member, the moving direction of the light sources is made substantially parallel to the direction of alignment of the light sources, while when there is little difference in speed between the photosensitive member and the light sources, the light sources are moved in the direction which is determined by the sum of the respective vectors of the moving speed of the photosensitive member and the moving speed of the light sources.

Above and other objects, features and advantages of the invention will be apparent from the following description taken in connection with the accompanying drawings.

BRIEF DESCRIPTION OF THE DRAWINGS

FIG. 6 is a perspective view showing a liquid crystal shutter member and a photosensitive drum, in a third embodiment of the present invention; and FIG. 7 is a cross sectional view of a liquid crystal member.

DETAILED DESCRIPTION OF PREFERRED EMBODIMENTS

Figure 1:
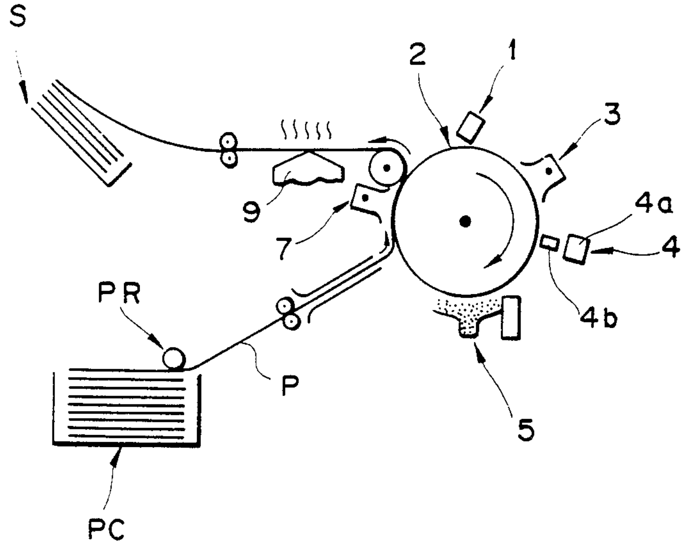
FIG. 1 is a schematic diagram showing a general arrangement of a main portion of a photographic printer.

FIG. 1 is an explanatory diagram showing the arrangement of a main portion of a photographic printer which employs a photosensitive member printing apparatus according to the present invention. The term "photosensitive" is hereinafter simply referred to as "sensitive". In the drawing, a sensitive drum 2 is arranged to rotate in the direction of an arrow. A cleaning device 1, a charging device 3, an exposure device 4, a developing device 5, and a transferring-corona generating device 7 are disposed around the sensitive drum 1 in this order in the rotating direction of the sensitive drum 1. As the sensitive drum 2 rotates, the surface of the sensitive drum 2 is electrically and physically initialized or made to be in its initial state by the cleaning device 1, and then charged in positive polarity by means of a plus corona generated by the charging device 3. The exposure device 4 is constituted by an array of light sources 4*a* and a rod lens 4*b*, so that a latent image is formed on the surface of the sensitive drum 2 on the basis of the quality of light in accordance with the date fed from a host side (not shown). Toner is attracted onto the latent image portion on the sensitive drum 2 by the developing device 5. Sheets of recording paper P is successively taken out of a paper cassette PC by a pickup roller PR and supplied one by one onto the sensitive drum 2. The toner attracted on the latent image portion on the sensitive drum 2 by the developing device 5 is transferred onto the recording paper P by the transferring corona generating device 7. The tone transferred onto the recording paper P is thermally fixed by a thermally fixing device 9 and the recording paper P is then fed to a stacker S.

Figure 2:
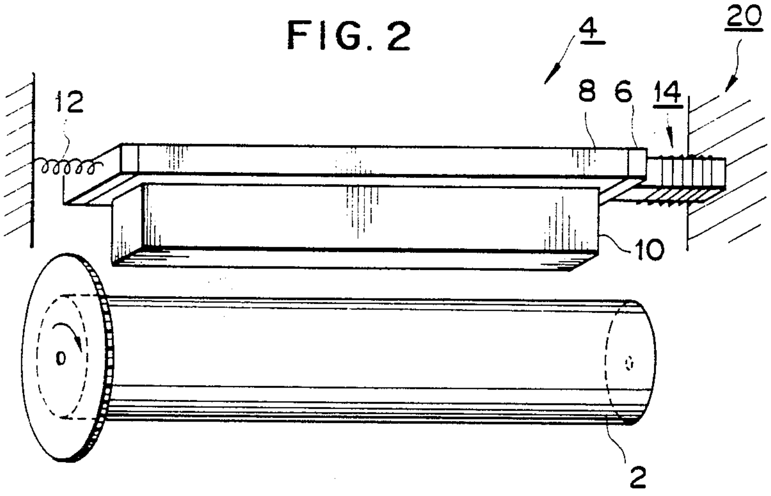
FIG. 2 is a perspective view showing an LED array module and a photosensitive drum, in a first embodiment of the present invention.

FIG. 2 is a schematic diagram showing the arrangement of the sensitive drum 2 and the exposure device 4 taken out of the arrangement of FIG. 1. The sensitive drum 2 is arranged to be rotated by an actuator (not shown) stepwise in the direction of an arrow as shown in the drawing. The exposure device 4 arranged above the sensitive drum 2 is a main portion of the present invention and is referred to as "an LED array module" in the present embodiment because an LED array module is used as the exposure device 4. The LED array module 4 is constituted by a substrate 6 on which an LED array and an IC for driving the LED array are mounted, a mask member 8 which covers the substrate 6 to throttle light emitted from LED elements of the LED array as will be described later, and a converging rod array lens 10 for focusing and guiding the light emitted from the LED elements onto the sensitive drum 2. The LED array module 4 is mounted on an LED printer such that the opposite ends of the LED array module 4 are attached to a frame 20 of the LED printer respectively through a spring 12 and through a vibrator 14 constituted by piezoelectric elements at another end, so that the LED array module 4 is movable in the axial direction of the sensitive drum 2.

Figure 3:
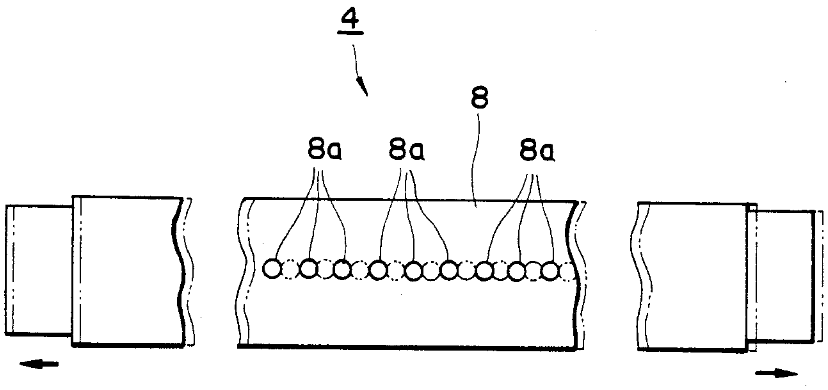
FIG. 3 is a schematic diagram for explaining the LED array module.

FIG. 3 is a diagram for explaining the thus movably arranged LED array module 4 when viewed at its surface opposite to the sensitive drum 2. As shown in the drawing, a number of windows **8*a* are serially formed in the mask member 8 so as to be aligned in the moving direction of the LED array module 4, that is, in the direction of an arrow in the drawing. The LED elements provided on the LED array disposed on the opposite side of the windows can be seen through the windows 8*a*. The pitch of the windows 8*a* is selected to be wider than the pitch of predetermined exposure points on the sensitive drum 2, the former being twice as wide as the latter in this embodiment of the present invention. The distance of movement of the LED array module 4 when the module 4 is moved as described above is selected to be equal to the exposure pitch, so that the respective windows 8*a* move to positions shown by a dotted line in FIG. 3 to thereby cover all the exposure points on the sensitive drum 2, when the LED array module 4 is moved. The actuation of the vibrator 14 is controlled by a suitable controller (not shown) so that the LED array module 4 is moved by the vibrator 14 in synchronism with the stepwise rotation of the sensitive drum 2 so that the LED array module 4 is reciprocated once while the sensitive drum 2 is rotated by one step. Accordingly, it is possible to perform exposure linearly on the sensitive drum 2 with synthesized density of light passed through the windows indicated by the solid and dotted lines as shown in FIG. 3**.

Figure 4:
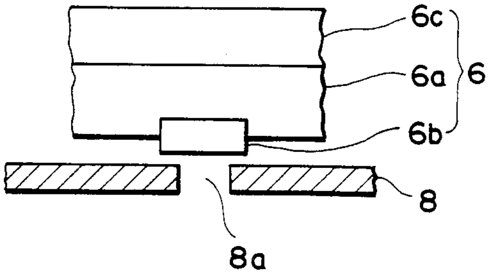
FIG. 4 is an enlarged diagram showing an LED element in the LED module.

FIG. 4 is an explanatory diagram showing an enlarged portion including one of the LED elements of the LED array module 4. As described above, the substrate 6 is provided with an LED array **6*a* and an IC 6*c* for controlling the actuation of a plurality of LED elements 6*b* formed on the LED array 6*a*. As shown in the drawing, the size of each of the LED elements 6*b* is selected to be larger than the corresponding one of the windows 8*a* provided in the mask member 8 so that the light emitted from the LED elements 6*b* are throttled by the corresponding windows 8*a*. The driving IC 6*c* controls the on/off of the LED elements 6*b* twice at a first and a second timing for every reciprocation of the LED array module 4. That is, selected ones of the LED elements 6*b* are simultaneously turned on for a certain while at the first timing, that is, when the windows 8*a* come to the positions indicated by the solid line in FIG. 3, and simultaneously turned on for a certain while at the second timing, that is, when the windows 8*a*** come to the positions indicated by the dotted line in the same drawing.

By using the thus arranged LED array module 4 of the embodiment described above, an LED printer having the same high resolution as the conventional one can be produced by means of such an extremely simple semiconductor manufacturing technique that the LED elements **6*b* are formed at intervals of the half pitch of the exposure points on the sensitive drum 2. Since LED tips of the respective LED elements are manufactured such a simple manner so that the yield can be much improved and that the fraction defective in the LED array manufacturing step such as dispersion in quantity of light emission at junctions in the respective LED tips, or the like, can be reduced. It is not necessary to make the size of each of the LED elements 6*b* to strictly coincide with the size corresponding to one dot on the sensitive drum 2, and the resolution can be improved through the throttle effect by means of the mask member 8**.

The absolute number of the LED elements **6*b* is small so that even when the dispersion in quantity of light emission of the respective LED elements 6*b* is required to be corrected, a small number of circuits will suffice for the correction corresponding to the number of the LED elements 6*b***. Further, the current consumption for turning all the LED elements on, which has been discussed above as one of the defects of the photographic printer, can be reduced to the half of that in the prior art.

Figure 5:
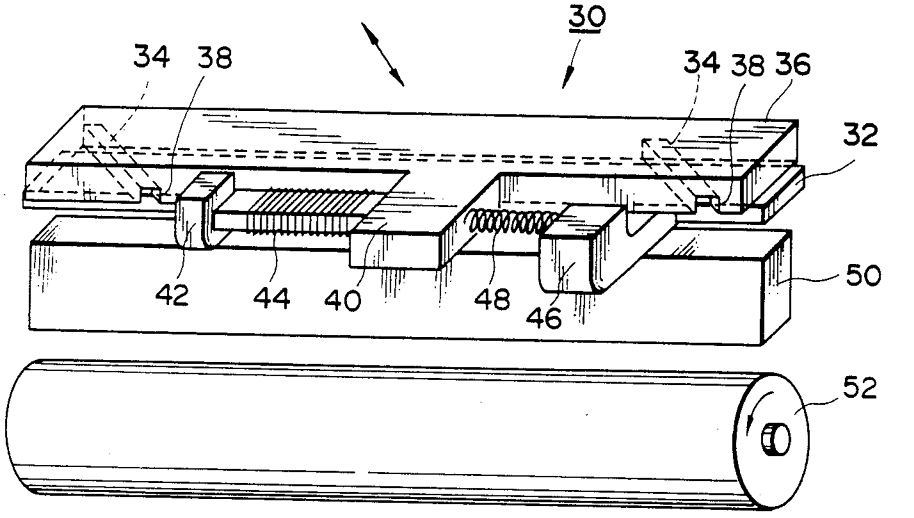
FIG. 5 is a perspective view showing a second embodiment of the LED array module according to the present invention.

FIG. 5 is a schematic diagram showing the arrangement of an LED array module 30 in a second embodiment of the present invention. Although the sensitive drum 2 is rotated stepwise in the foregoing embodiment, the invention is applied, in this embodiment, to the case where the sensitive drum is rotated at a sufficiently high constant speed similarly to the conventional one. If the same arrangement as the foregoing embodiment is employed in such a case where the sensitive drum is rotated at a high constant speed, the determination of the control timing of the driving IC **6*c* would become difficult and the rotational speed of the sensitive drum 2** would be limited because the LED array module must be moved at an extremely high speed.

In this second embodiment, however, the LED array module 30 is arranged in such a manner as follows. That is, the LED array module 30 is constituted by a guide member 36 fixedly attached to a frame of a printer (not shown) and a substrate 32 provided with protrusions 34 formed on the upper surface thereof so that the protrusions 34 are fitted into corresponding grooves formed in the lower surface of the guide member 36. The protrusions and the grooves are formed so as to be somewhat slanted relative to the axial direction of the guide member 36 and the substrate 32. The guide member 36 has a protrusion 40 formed at the side surface thereof so as to project substantially perpendicularly to the axial direction of the guide member 36. A support 42 is formed so as to project from the substrate 32 substantially in parallel to the protrusion 40 so that a vibrator 38 is supported between the protrusion 40 and the support 42, and another support 46 is formed so as to project from the substrate 32 substantially in parallel to the protrusion 40 so that a spring 48 is supported between the protrusion 40 and the support 46. Thus, the substrate 32 is moved by the vibrator 44 and the spring 48 to reciprocate in the direction of an arrow as shown in the drawing because the protrusions 34 and the grooves 38 are slanted relative to the axial direction. The vibrator 44 may be constituted by piezoelectric elements. An LED array (not shown) is provided on the lower surface of the substrate 32 so as to be in opposition to a converging rod lens 50 so that the light emitted from LED elements of the LED array (not shown) are converged on a sensitive drum 52. The actuation of the vibrator 44 is controlled by a suitable controller (not shown) so as to make the rotational speed of the sensitive drum 52 coincident with the component of the moving speed of the LED array in the direction of rotation of the sensitive drum 52, so that the light emitted from the LED elements of the LED array can be focused linearly on the one and the same axial line on the circumference of the sensitive drum 52 even while the sensitive drum 52 is rotating. It will be therefore understood that the actuation of the LED elements are controlled by a suitable control means (not shown), for example, mounted on the substrate similarly to the controlling IC in the first embodiment, so that all the LED elements are simultaneously turned on for a certain while for every line to be irradiated on the circumference of the sensitive drum 52 and simultaneously turned off while the line to be irradiated is shifted to the next one, that is, while the substrate 32 is moved backward to its initial position. Thus, this embodiment has advantages that the control of the exposing timing, etc., can be extremely simply achieved and that printing can be made at a high speed because the rotational speed of the sensitive drum 42 can be made sufficiently high. The LED elements of the LED array are provided so as to be aligned in the axial direction of the substrate 32 at intervals corresponding to the half of the resolution.

FIG. 6 shows a third embodiment of the present invention and corresponds to FIG. 2 of the foregoing embodiment. In this embodiment, an exposure device 4 is constituted by a crystal liquid shutter 60 and a linear light source 62. The linear light source 62 is fixed and turned on by ordinary means. The crystal liquid shutter 60 is disposed under the linear light source 62 and connected to a frame 20 of the printer at its one end through a spring 12 and at its other end through a vibrator 14 so as to be reciprocated or vibrated by the vibrator 14 similarly to the foregoing embodiment. The effects of the present invention can be achieved by the vibration of the liquid crystal shutter 60.

FIG. 7 is an explanatory diagram showing the liquid crystal shutter, in which a liquid crystal is enclosed in a space between upper and lower polarization plates 64 and upper and lower glass substrates 66 respectively disposed at the inside of the upper and lower polarization plates 64. A necessary number of transparent electrodes 70 are aligned at intervals in the direction of the alignment thereof at the inside of each of the upper and lower glass substrates 66, so that the respective upper and lower electrodes 70 are opposite to each other. Selective application of a signal voltage across the upper and lower opposite transparent electrodes 70 from a suitable control circuit (not shown) causes the liquid crystal between the upper and lower opposite electrodes 70 to enable/disable luminous flux from the linear light source 62 to pass through the liquid crystal. A light shield member 72 is closely attached to the under surface of the lower polarization plate 64. A plurality of windows 74 are formed in the light shield member 72 at positions corresponding to the respective lower transparent electrodes 70 so as to allow luminous flux to pass therethrough. Upon application of a signal voltage across the upper and lower opposite transparent electrodes 70, accordingly, the luminous flux from the linear light source 62 is allowed to selectively pass through the thus arranged liquid crystal shutter 60 to reach a sensitive drum 2 disposed below the liquid crystal shutter 60. Accordingly, the windows 74 in this embodiment correspond to the LED elements in the foregoing embodiment. The objects of the present invention can be achieved by the reciprocation or vibration of the liquid crystal shutter 60 in the direction shown by an arrow in the drawing, with no restriction in manufacturing accuracy of the liquid crystal shutter.

Although description has been made so that the pitch of arrangement of the light sources is selected to be the half of the resolution in the foregoing embodiments, the pitch is not limited to this value but may be selected to be a suitable value on the basis of the synthetic judgement on the moving speed and the accuracy thereof of the light sources and the yield of the light sources. Although description has been made as to the vibrator constituted by piezoelectric elements acting as driving means for moving the light sources, various techniques for moving a head of the shuttle type at a sufficiently high speed with high accuracy, for example, in a printer of the shuttle type or the like, have been proposed recently, and such techniques may be used. Further, description has been made as to the means for moving the light sources slantingly which is realized by the guide member, it is needless to say that the light sources may be arranged so as to be directly moved slantingly.

As described in detail with respect to the embodiments, in the photographic printing apparatus according to the present invention, light sources array are disposed at intervals selected to be larger than the pitch of exposure density is suitably moved so that an ideal light sources can be realized.

Accordingly, the yield of the light sources becomes very good and it is easily achieved to reduce the light sources in size as well as in cost.

It is apparent that any suitable means other than the foregoing LED array and the liquid crystal shutter can be used as the light source.

What is claimed is:

1. A photographic printing apparatus comprising:

a photosensitive member;

an exposure device disposed in opposition to said photosensitive member and controlled to emit light so as to expose said photosensitive member to make record thereon, said exposure device being provided with a plurality of light sources arranged to be aligned at intervals larger than a pitch of exposure density previously set so as to expose said photosensitive member;

means for controlling said light sources to emit light when said light sources are disposed at predetermined exposure positions as said exposure device moves; and means for moving said exposure device to reciprocate in such a direction that the light emitted from said light sources are radiated on a predetermined linear position on said photosensitive member.

2. A photographic printing apparatus according to claim 1, in which said photosensitive member is a photosensitive drum arranged to be rotatable, said light sources being provided to be aligned in axial direction of said photosensitive member, said exposure device being arranged to be movable in the axial direction of said photosensitive drum, said linear position being extended on a circumference of said photosensitive drum in the axial direction thereof.

3. A photographic printing apparatus according to claim 2, in which said light sources are disposed at a pitch which is twice as large as a pitch of predetermined exposure points aligned on said linear position, said light sources being arranged to reciprocate over a predetermined distance corresponding to said pitch of said exposure points, said light sources being controlled to emit light when said exposure device is in a position at each of opposite ends of said predetermined distance.

4. A photographic printing apparatus according to claim 2, in which said photosensitive drum is arranged to rotate stepwise and said exposure device is arranged to move in synchronism with the stepwise rotation of said photosensitive drum so that said exposure device reciprocates once while said photosensitive drum rotates by one step.

5. A photographic printing apparatus according to claim 1, in which said photosensitive member is a photosensitive drum arranged to be rotatable, said light sources being provided to be aligned in axial direction of said photosensitive drum, said exposure device being arranged to be movable in the direction slanting relative to the axial direction of said photosensitive member, movement of said exposure device being controlled so as to make a rotational speed of said photosensitive drum coincident with a component of a moving speed of said exposure device in the direction of rotation of said photosensitive drum so that the light emitted from said light sources are radiated onto said linear position on one and the same axial line on a circumference of said photosensitive drum while said photosensitive drum is rotating.

6. A photographic printing apparatus according to claim 1, in which said exposure device comprises an LED array having a plurality of LED elements.

7. A photographic printing apparatus according to claim 1, in which said exposure device comprises a light emitting source and a liquid crystal shutter array for selectively passing light from said light emitting source to said photosensitive drum therethrough.

8. An LED printer comprising a rotary photosensitive drum, cleaning means for making a surface of said photosensitive drum to be in an initial state, charging means for charging the surface of said photosensitive drum, exposing means for exposing the charged surface of said photosensitive drum to form a latent image of information carried by light given by said exposing means, developing means for make said latent image visible by toner attached thereto, transfer means for transferring the visible image from said photosensitive drum onto a recording medium, and fixing means for fixing the visible image on said recording medium, in which said exposing means comprising:

an LED array disposed to be in opposition to said photosensitive drum and controlled to emit light so as to expose said photosensitive drum to form said latent image thereon, said LED array being provided with a plurality of LED elements arranged to be aligned at intervals larger than a pitch of exposure density previously set so as to expose said photosensitive drum;

means for controlling said LED elements to emit light when said LED elements are disposed at predetermined exposure positions as said LED array moves; and means for moving said LED array to reciprocate in such a direction that the light emitted from said LED elements are radiated on a predetermined linear position on the surface of said photosensitive drum.

* * * * *